United States Patent Office 3,623,911
Patented Nov. 30, 1971

3,623,911
HIGH-RATE CONSUMABLE METAL ELECTRODES
Harry G. Oswin, Chauncey, N.Y., assignor to Leesona Corporation, Warwick, R.I.
No Drawing. Filed Mar. 3, 1969, Ser. No. 803,954
Int. Cl. H01m 13/00
U.S. Cl. 136—83          9 Claims

ABSTRACT OF THE DISCLOSURE

Zinc electrodes containing a minor amount of a metal which is capable of creating cation vacancies in a zinc oxide lattice such as gallium or tin are described. The gallium or tin additive helps to prevent passivation of the zinc during rapid discharge of the electrodes in an electrochemical cell and reduces the amount of cell electrolyte needed for efficient performance. The gallium or tin is preferably introduced into the zinc by means of alloying, e.g., by electrolytic co-reduction of zinc and gallium and/or tin compounds.

FIELD OF THE INVENTION AND DESCRIPTION OF PRIOR ART

This invention relates to consumable metal anodes. More particularly, this invention relates to consumable zinc anodes capable of rapid discharge for use in high energy cells or batteries which employ a consumable zinc anode. The zince anodes contain a minor amount of a second metal, preferably gallium or tin.

Although zinc anodes have been used for decades in cells capable of generating electrical energy, high energy density cells employing zinc or other consumable metals are of relatively recent origin. Examples of high energy electrochemical systems are the silver/zinc cell and the metal/air cell, more particularly the zinc/air cell. A constant goal of this technology is to further increase the energy capabilities of these cells. One method of improving zinc electrodes is to provide a high surface area per unit weight. However, problems are encountered in the use of such porous electrodes. One problem is passivation, i.e., the tendency of the zinc metal to become covered with a layer of zinc oxide or hydroxide which inhibits further oxidation. Another problem is the diffusion limitations of the electrodes which require the presence of excessive amounts of electrolyte. An economic problem is the increased cost and complexity of manufacturing a porous zinc electrode in comparison to nonporous sheet zinc electrodes such as those of the common "dry" cell.

OBJECTS OF THE INVENTION

Accordingly, it is an object of this invention to provide a consumable metal anode which is resistant to passivation at high discharge rates.

Another object of this invention is to provide a consumable metal anode comprising zinc which is highly efficient and which does not require large amounts of electrolyte for efficient operation.

Another object of this invention is to provide an electrochemical cell for the generation of electrical energy which employs a consumable metal anode which is resistant to passivation, does not require large amounts of electrolyte for efficient operation, and is relatively simple to manufacture.

SUMMARY OF THE INVENTION

The objects of this invention are accomplished by fabricating a consumable zinc anode which includes a minor amount of a metal such as gallium and tin which tends to cause cation vacancies in the lattice of the metal oxide. The additive metal is preferably present in solid solution form in the zinc lattice.

DETAILED DESCRIPTION AND EXAMPLES

Although this description is directed primarily to consumable metal anodes comprising zinc and a minor amount of additive metal such as gallium or tin, the basic principles of this invention are applicable to other anode compositions which are also subject to passivation. Although gallium and/or tin are the preferred additive metals, minor amounts of other additive metals selected from Groups III and IV-B of the Periodic Table such as In, Tl, Pb, and Ge are effective. The oxidized form of the additive metal should have a valency greater than 2 and preferably 3 or 4. The exact function of this additive metal is not clearly understood, but a theoretical explanation is that upon discharge of the anode, the additive forms cation vacancies in the zinc oxide, enhancing the rate of diffusion through the electrode. Thus, the additive metal is in essence a controlled impurity in the anode metal oxide. This accelerated diffusion effect is highly important in high energy cells comprising an alkaline electrolyte. In such cells, zinc oxide, produced at the anode during discharge, is soluble in the electrolyte. Passivation of the anode is determined by the relative rates of formation of zinc oxide and its dissolution in the caustic electrolyte. Accordingly, in high energy density cells, the rate of zinc oxide formation can be so rapid that the rate of dissolution can fall behind the oxidation rate, resulting in passivation. This passivation is particularly critical during rapid discharging, repeated cycling, or the like.

Thus, though gallium and tin are the preferred additive metals, other metals capable of being integrated into an anode metal oxide lattice in a manner tending to create cation vacancies are suitable for use according to this invention. Since the additive metal is essentially a controlled impurity, it is preferably present in small amounts, e.g., less than about 2.5 atomic percent, with the preferred range being 0.01–0.5 atomic percent. The optimum atomic percentage is determined by the nature of the "impurity" and of the "host" lattice.

Any of the known alloying methods are operable to prepare the anode metal of this invention, e.g., fusion and/or chemical and/or electrolytic co-reduction and/or co-deposition techniques. Preferably the zinc will contain the additive metal in solid solution form. Intermetallic and interstitial compounds prepared by electrolytic co-reduction techniques, or the like, can be converted to a solid solution by heating the intermetallic or interstitial alloy close to or above its melting point followed by cooling. Methods of heat treating alloys to produce homogeneous solid solutions are well known in the art. It is noted, however, that although solid solutions are preferred, any alloy providing a cation vacancy effect is adaptable to the principles of this invention.

A convenient method for producing the alloys used in the anodes of this invention is the electrolytic co-reduction technique. Zinc and gallium and/or tin are co-precipitated by electrolytic reduction of a solution containing salts or other dissolved compounds of these metals. The solution or electrolyte can be acidic, basic, or neutral; and the dissolved compounds can be cyanides, mixed oxides and/or hydroxides, or the like. The preferred electrolytic reduction medium is an aqueous solution of an alkali metal hydroxide containing dissolved zinc oxide or hydroxide, gallium hydroxide, and/or a stannate or tin (II) hydroxide. The zinc oxide and the additive metal compound are mixed with water to form a slurry which is passed onto a metal current collector such as a piece of silver gauze or screen. The slurry is wrapped in a porous membrane and dried. After reduction in an alkali metal hydroxide medium, the resulting zinc alloy is carefully washed with distilled water and dried in a vacuum to remove traces of the electrode, trapped gases, etc. The alloy is then molded into a sheet or other desired configuration under heat and pressure and allowed to cool so as to produce a slight disorientation of the crystalline structure. The molded alloy can be employed in this form as an anode for use in an electrochemical cell or re-fabricated into an electrode of any conventional anode form, including foraminous sheets, foraminous sheets coated with sponge metal, or the like.

The zinc anodes of this invention can be used in Leclanche cells or any of the conventional electrochemical systems employing consumable zinc anodes. However, the preferred systems are the high energy density cells such as the zinc/air cell, the zinc/oxygen cell, and the silver/zinc cell. In these cells the zinc is consumed at a high rate during discharge. In contrast to this rapid consumption of zinc, in low energy density primary cells the zinc anode is rarely if ever completely consumed during the life of the cell.

It is, of course, to be understood that both primary and secondary cells are within the scope of this invention. It should also be understood that the invention is not limited to anode alloys comprising a single anode metal and/or a single additive metal. Mixtures of additive metals can also be used.

The following examples illustrate the principle and practice of this invention. Parts are by weight unless indicated otherwise.

EXAMPLE I

A silver screen provided with a terminal strip was pasted with an aqueous slurry containing 4.049 grams of zinc oxide and 0.075 gram of potassium stannate trihydrate. The pasted screen was wrapped in Kraft paper and dried in a hot air oven at 50° C. for one hour. The resultant assembly was then placed in a reducing tank containing an aqueous 5 weight percent KOH solution. The reduction was carried out at 4 volts and 0.16 amp per square inch for 20 hours to ensure complete reduction of zinc oxide. The assembly, now containing a spongy zinc alloy deposit, was removed from the KOH electrolyte and carefully washed and dried under vacuum to remove all traces of electrolyte and trapped gases. The screen/zinc alloy assembly was then subjected to 75 p.s.i. of pressure and heated to 250° C. in an inert atmosphere. The resulting zinc/tin alloy sheet had a composition of approximately 99.5 atomic percent zinc and 0.5 atomic percent tin.

The porous zinc/tin alloy sheet containing the silver current collector was utilized as the consumable metal anode of a zinc/air bi-cell of the type described in Oswin et al., U.S. application Ser. No. 517,603 filed Dec. 30, 1965. The design of the cell utilizes an envelope cathode comprising a hydrophobic polymer member having the inner surface coated with a uniform admixture of a catalytic material. In this case the polymer member is PTFE with the catalytic layer containing particles of platinum black and polytetrafluoroethylene. The air cathode had a platinum loading of approximately 7 mg./cm.$^2$ The electrolyte was a 30 percent aqueous KOH solution retained in a hydrophilic matrix. The zinc/air cell was completely discharged at a current density of 75 ma./cm.$^2$ The cell was charged at a current density of 35 ma./cm.$^2$ geometric surface area of zinc, the current being applied by the pulsed technique, 10 milliseconds on and 20 milliseconds off. During the course of 20 charge/discharge cycles, no evidence of passivation was observed.

EXAMPLE II

The procedure of Example I was followed with the exception that 4.065 grams of zinc oxide and 0.006 gram of gallium hydroxide were used. The resultant anode alloy metal contained approximately 99.9 atomic percent zinc and 0.1 atomic percent gallium. The performance of the zinc/gallium electrode was comparable to the zinc/tin electrode.

The foregoing description and examples are intended to be merely illustrative of the present invention. For example, the zinc anodes of this invention can be amalgamated in the conventional manner. This modification and other such modifications are within the skill of the art. The scope of the invention is to be determined from the appended claims.

What is claimed is:

1. An electrochemical cell for the generation of electrical energy comprising a cathode, a consumable zinc anode, and an electrolyte, wherein the active material of the consumable zinc anode consists essentially of an alloy of a major amount of zinc and a minor amount of an additive metal selected from the group consisting of tin, gallium, and indium thereby inhibiting passivation of said zinc anode.

2. The cell according to claim 1 wherein the additive metal is present at from about 0.01–0.5 atomic percent.

3. The cell according to claim 1 wherein the additive metal is present in solid solution form in the zinc lattice.

4 The cell according to claim 2 wherein the additive metal is tin.

5. The cell according to claim 2 wherein the additive metal is gallium.

6. The cell according to claim 1 wherein the said cathode is an air depolarized composite cathode comprising a hydrophobic member in contact with a catalytic layer, said catalytic layer being in contact with the electrolyte of the cell.

7. The cell according to claim 6 wherein the hydrophobic member is polytetrafluoroethylene and the catalytic layer comprises a mixture of catalyst and polytetrafluoroethylene.

8. The cell according to claim 7 wherein the said electrolyte is an alkali metal hydroxide.

9. The cell according to claim 1 wherein the additive metal is indium.

References Cited

UNITED STATES PATENTS

| 3,395,047 | 7/1968 | Terry et al. | 136—86 |
| 3,378,406 | 4/1968 | Rosansky | 136—86 |
| 3,240,688 | 3/1966 | Pryor et al. | 136—83 |
| 2,233,578 | 3/1941 | Boak | 136—126 |

WINSTON A. DOUGLAS, Primary Examiner

H. A. FEELEY, Assistant Examiner

U.S. Cl. X.R.

136—86, 125, 30